Figure 1:
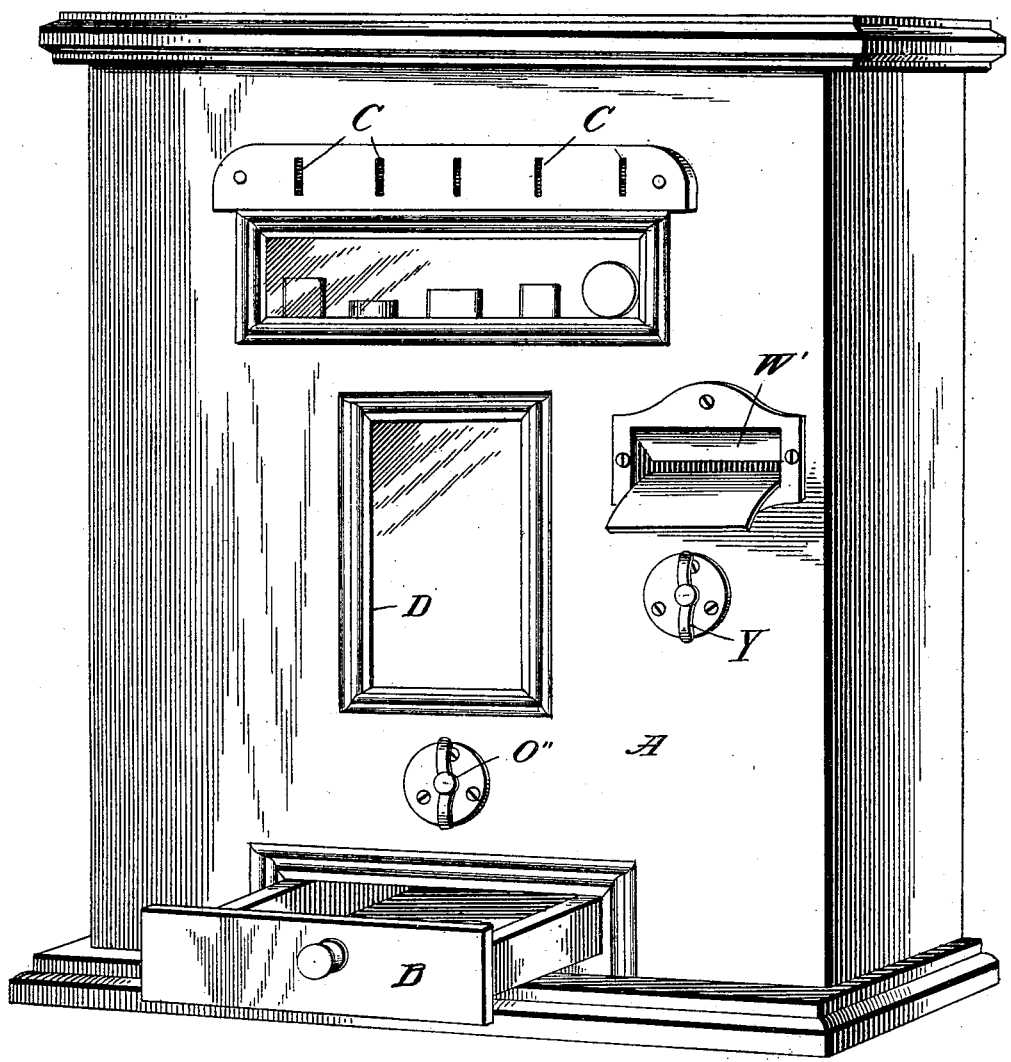

No. 673,618. Patented May 7, 1901.
A. C. EDSEN.
COIN CONTROLLED APPARATUS.
(Application filed June 25, 1900.)
(No Model.) 7 Sheets—Sheet 1.

WITNESSES:
L. C. Hills.
Jos. milans

INVENTOR
Alfred C. Edsen,
BY
Attorneys

No. 673,618. Patented May 7, 1901.
A. C. EDSEN.
COIN CONTROLLED APPARATUS.
(Application filed June 25, 1900.)

(No Model.) 7 Sheets—Sheet 2.

WITNESSES:

INVENTOR
Alfred C. Edsen,
BY
Attorneys

No. 673,618. Patented May 7, 1901.
A. C. EDSEN.
COIN CONTROLLED APPARATUS.
(Application filed June 25, 1900.)
(No Model.) 7 Sheets—Sheet 5.

WITNESSES:
L. C. Hills
Jas. Milans

INVENTOR
Alfred C. Edsen,
BY
Attorneys

No. 673,618. Patented May 7, 1901.
A. C. EDSEN.
COIN CONTROLLED APPARATUS.
(Application filed June 25, 1900.)
(No Model.) 7 Sheets—Sheet 6.
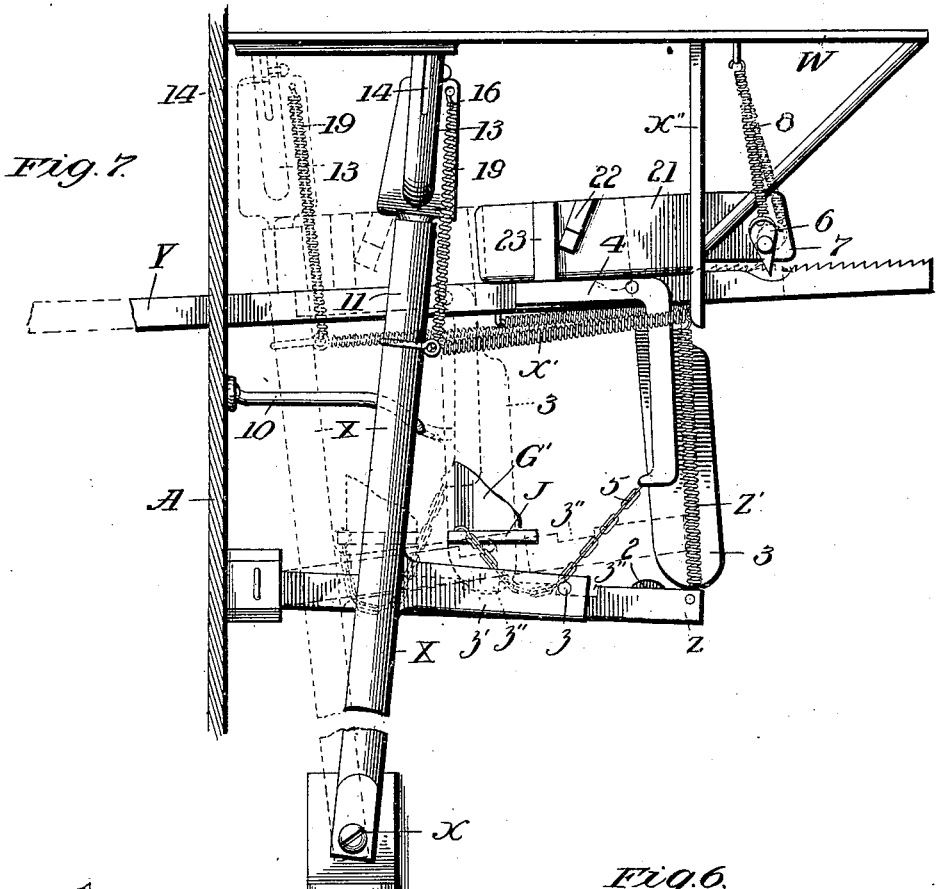
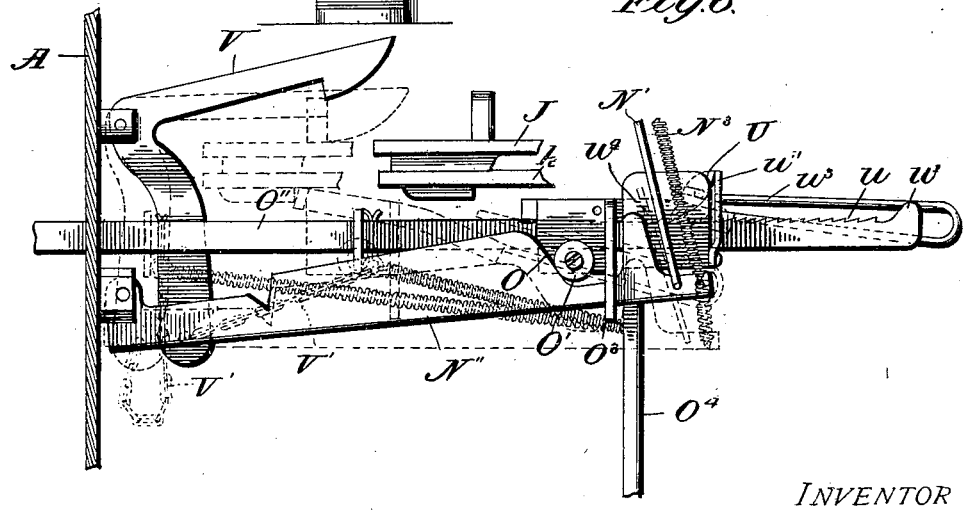
WITNESSES:
L. C. Hills
Jas. Milans
INVENTOR
Alfred C. Edsen.
By Nils B. Stromet Co.
Attorneys.

No. 673,618. Patented May 7, 1901.
A. C. EDSEN.
COIN CONTROLLED APPARATUS.
(Application filed June 25, 1900.)
(No Model.) 7 Sheets—Sheet 7.

WITNESSES:

INVENTOR
Alfred C. Edsen,
By
Attorneys

UNITED STATES PATENT OFFICE.

ALFRED C. EDSEN, OF CHICAGO, ILLINOIS.

COIN-CONTROLLED APPARATUS.

SPECIFICATION forming part of Letters Patent No. 673,618, dated May 7, 1901.

Application filed June 25, 1900. Serial No. 21,412. (No model.)

*To all whom it may concern:*

Be it known that I, ALFRED C. EDSEN, a citizen of the United States, residing at Chicago, in the county of Cook and State of Illinois, have invented certain new and useful Improvements in Coin-Controlled Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in that style of machines commonly known as "coin-controlled apparatus," wherein through the operation of a coin of predetermined denomination upon certain intermediate instrumentalities an article may be automatically delivered to a purchaser.

The invention has for its primary object the provision of means adapted to be used in conjunction with the article-delivery portion of the apparatus for delivering within convenient reach of the operator a bag or sheet adapted to receive the article or material released from the apparatus.

A further object of the invention relates to the provision of a series of delivery pockets or cups each provided with a slide capable of independent operation and in means adapted to be automatically operated through the medium of a coin and pull-lever for catching and holding or releasing said slides.

The invention further contemplates the means of connection between the cup-carrying member and a bag-delivering portion of the apparatus, whereby when a coin has been properly employed a bag-delivering arm will be released, so as to be carried forward by suitable means and eject a bag from a proper receptacle provided for the purpose.

The invention still further contemplates the provision of means whereby the pull-lever will normally be out of operative condition relative to the other portions of the machine, so that should the same be withdrawn before a coin has been dropped into the machine the pull-rod alone will be affected thereby; but whenever the proper coin is applied intermediate means will automatically throw said pull-lever into proper operative position to effect the desired movement to the associated delivery portions of the machine to cause the proper ejection of the article or material purchased.

Many other improved details in the operation and construction of the component parts of the apparatus will be apparent from the detail description hereinafter and the appended claims.

For the purpose of illustration an embodiment of the invention has been delineated in the accompanying drawings; but it is to be understood that various changes in the minor details and operations of various portions of the machine may be altered or dispensed with without in the least departing from the nature and spirit of the invention.

When hereinafter referring to the drawings, like reference characters will refer to corresponding parts in the several views.

Figure 2:
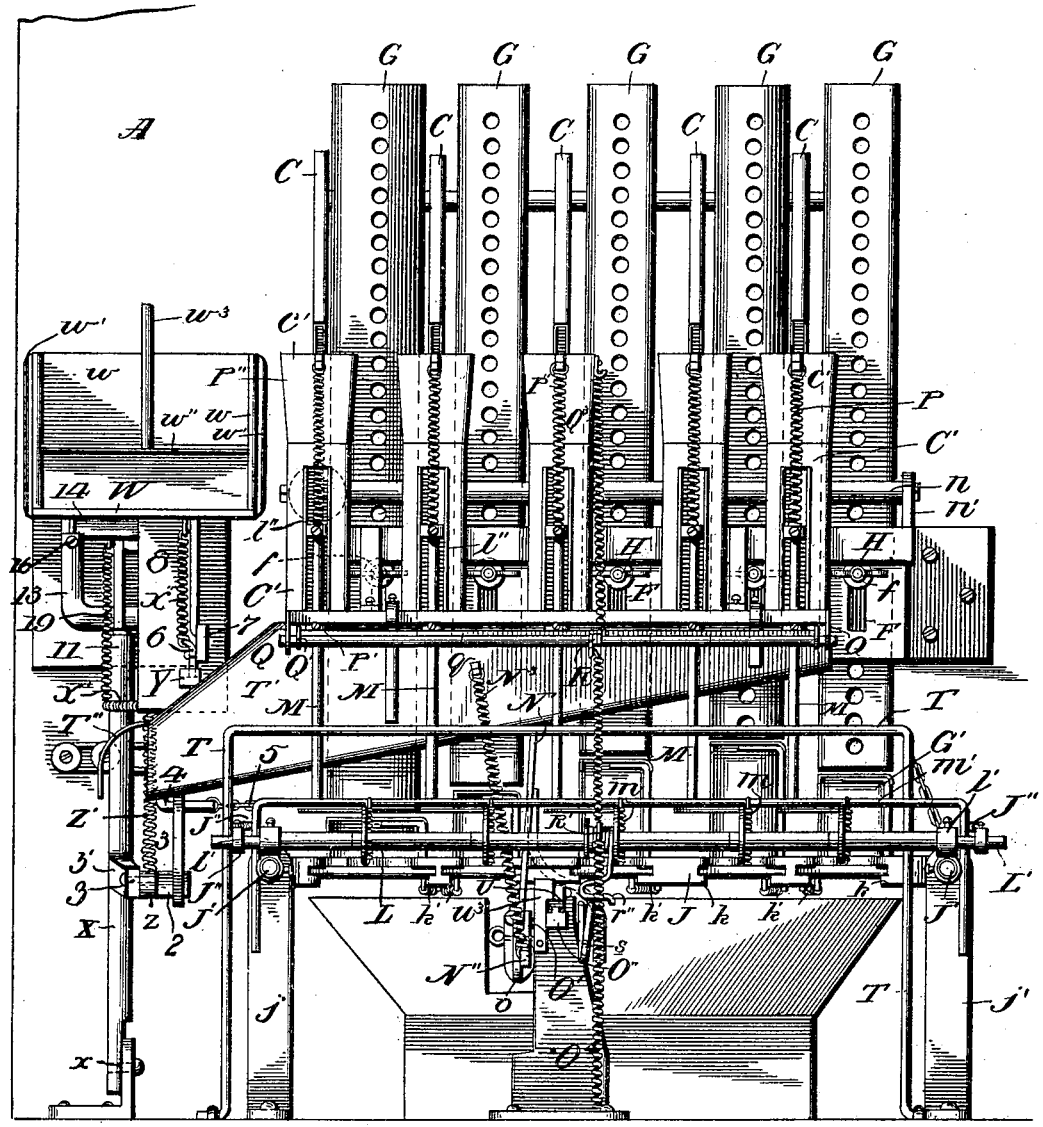
Figure 3:
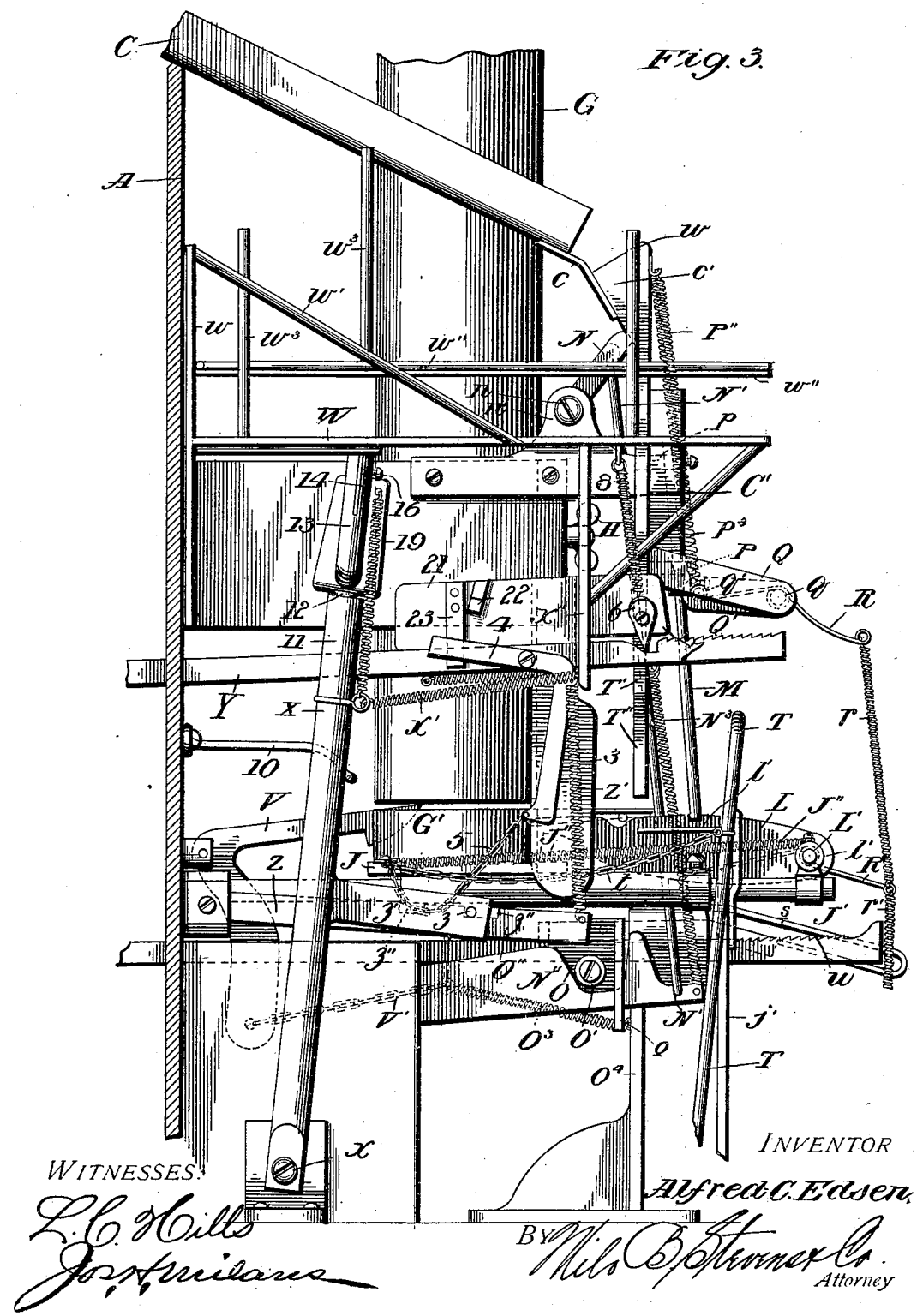
Figure 4:
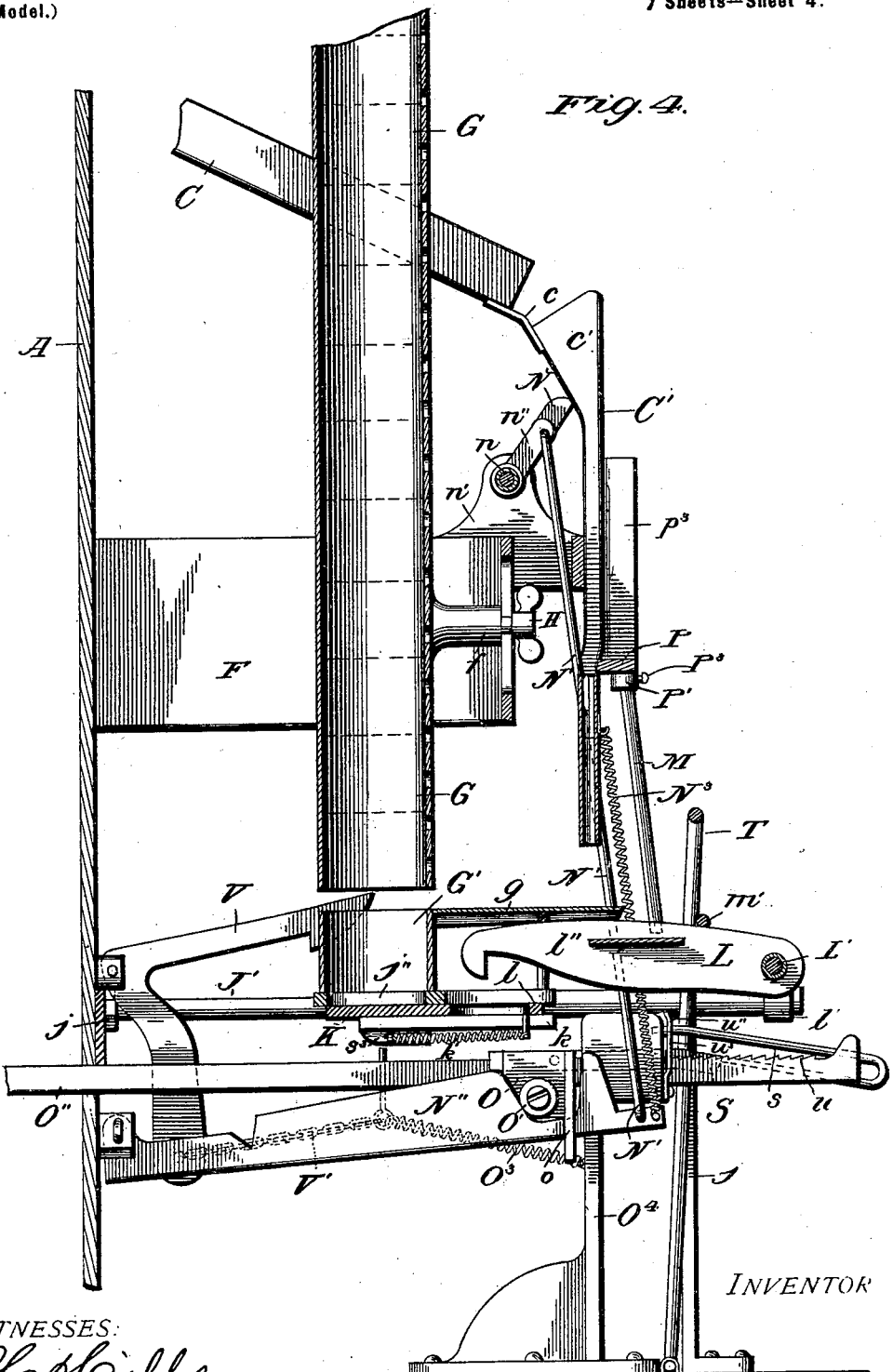
Figure 5:
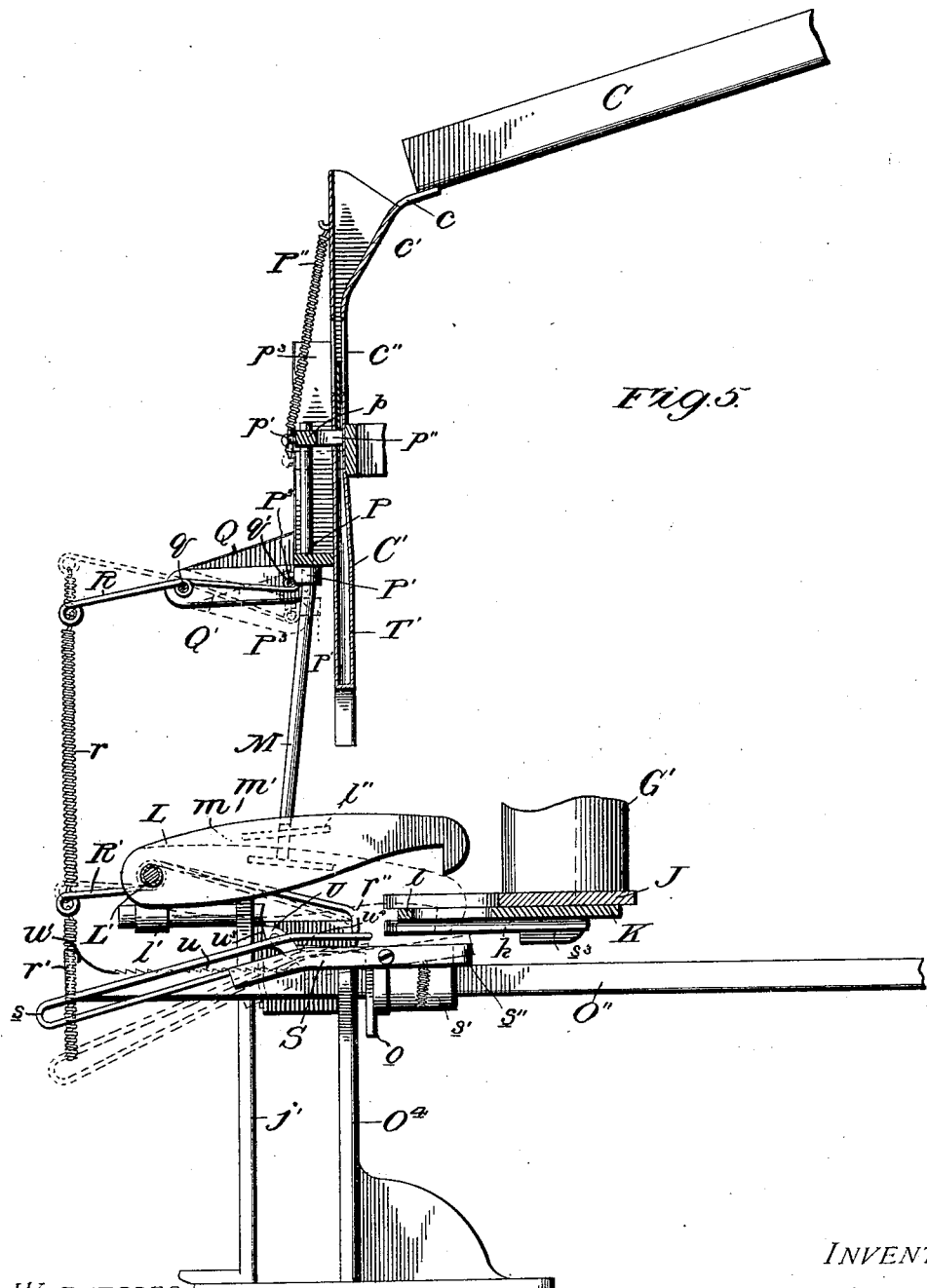
Figure 8:
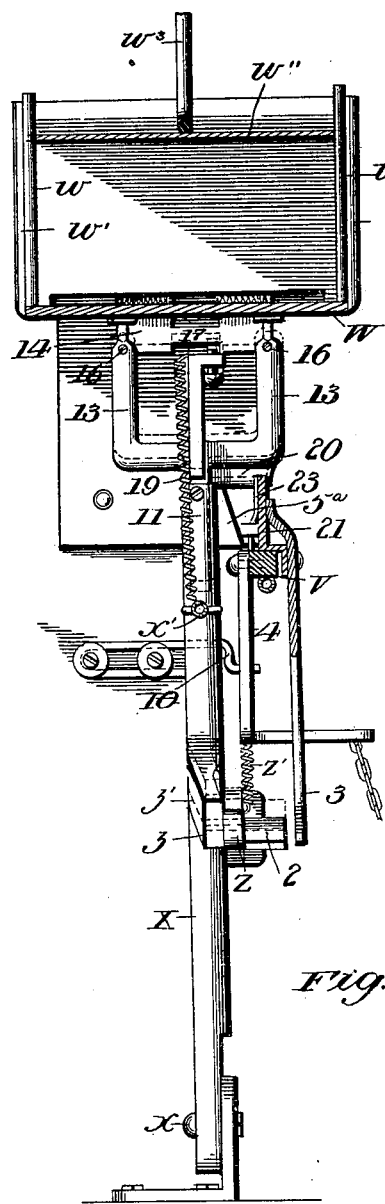
Figure 9:
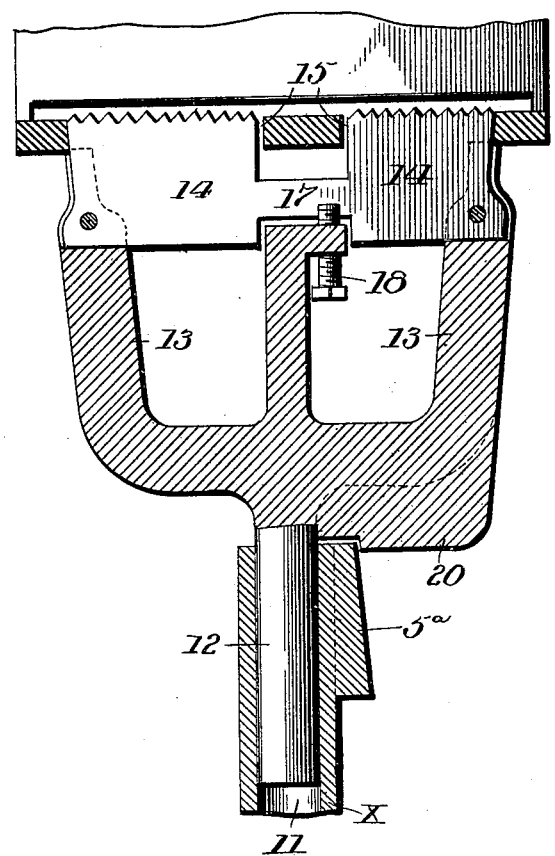

Figure 1 is a perspective view of the exterior of the apparatus as it appears in completed form ready for operation. Fig. 2 is a rear elevation of the complete machine with the casing removed. Fig. 3 is a side elevation, portions of the casing being shown in section. Fig. 4 is a vertical sectional view of the apparatus looking to the left of Fig. 2, certain details being omitted for the sake of clearness. Fig. 5 is a similar view looking to the right of Fig. 2, different parts being shown in section and elevation. Fig. 6 is a detail side elevation, certain parts being broken away, showing the operation of the catch for holding the delivery pocket or cup carrying member in its forward position; and Figs. 7, 8, and 9 are detail views showing the complete bag-delivery mechanism and details thereof.

Referring more specifically to the drawings, A represents a casing of any suitable configuration, preferably rectangular, as shown, adapted to completely inclose the operating parts of the machine, as is customary in this class of apparatus.

B is a drawer in the lower portion of the casing into which the material from the article-delivery portion of the apparatus is dropped within convenient access to the purchaser.

C designates the mouths of the inclined coin-chutes, adapted to project to the plane or slightly beyond the front wall of the casing and receive a coin of proper denomination and direct it to the operative portions of the machine. There may be any desirable number of these chutes, according to the different varieties of articles or material to be vended, five being preferably shown in the drawings.

D is a space for the receipt of a card of instructions, and E is a glass-fronted shelf or support, from which samples of the various articles or material may be displayed. Extending rearwardly from substantially the vertical central portion of the front face of the casing is a U-shaped bracket or support, which is adapted to support in proper relative positions elongated tubes or receptacles G, provided for the reception of the article or material to be sold. The bracket passes the rear of all of these tubes and is attached thereto by means of stubs $f$ on the respective tubes, which pass through slots F in the bracket and are clamped in adjustable positions thereon by means of the thumb-nuts H, as clearly seen in Fig. 5. Located directly below the tubes and forming continuations thereof are a series of pockets or cups G', into which the material drops from the tubes G, and these cups are carried by a support or sliding member J, which in turn slides back and forth upon the horizontally-disposed rods J', supported at $j$ on the wall of the machine and in the uprights $j'$. On the plane of the upper edges of the pockets G' are shelves extending rearwardly and designed to prevent the material in the tubes G from being discharged therefrom when the cups with their supporting member are drawn forwardly. The cup-supporting member J is provided with openings $j''$, directly beneath the cups, and these openings are normally closed by slides or false bottoms K, working in guides $k$ on the lower surface of the member J. In their normal position the slides are free to be carried back and forth with the member J and support whatever material may be contained in the cups from being discharged therefrom; but in order that a specific slide or slides may be held from movement with the cups and their carrying member when it is desired to discharge a selected article or material I have provided a series of catch-fingers L, equal in number to the number of slides, and these fingers are adapted when independently operated in a manner hereinafter pointed out to engage over the bars $l$ in the rear of the slides and, as will be apparent, retain the same in their normal position, when the member J may be readily slid away therefrom and the opening below the cups cleared for the passage of any article or material therein contained. These slides are provided with springs $k'$, adapted to throw the same into normal position when released from the catch-fingers. These catch-fingers are pivotally mounted on a rod L', mounted in brackets $l'$, carried at the extreme rear ends of the rods J'. The fingers are normally kept in elevated position, Figs. 4 and 5, by means of small coil-springs $m$, connected at one end to said fingers and at the opposite end to the rod $m'$, supported at its end upon the uprights $j'$. Flanges $l''$ extend outwardly from one side of the catch-fingers and are adapted to be engaged by push-rods M, operated indirectly by a coin, as will now be described.

The inclined coin-chutes C extend from the front of the casing rearwardly and downwardly to inclines $c$, connecting the lower ends of said chutes with the vertically-disposed guides or chutes C', somewhat enlarged at their upper ends, as shown at $c'$, for the purpose of permitting the coin to turn and enter the guides or chutes in a proper manner. Both the forward and rear walls of the chutes are slotted, as at $c''$, and arranged so as to be swung into and out of the forward slots are what I will term "push-fingers" N, rigidly secured to a pivot-bar $n$, supported in brackets $n'$ on the tube-supporting bracket F. About midway the length of the pivot-bar N is a lug or projection $n''$, to which the upper end of the rod N' is connected for turning the pivot-bar and incidentally operating the push-fingers. The rod N' extends downwardly to a point slightly above the plane of the upper edge of the drawer B, where it is connected to a pivoted member N''. Intermediate its ends this pivoted member has an inclined edge O, which is adapted to be engaged by a roller O', projecting to the side of and carried by the main pull-rod O'' of the apparatus. Guides $o$, also on the pull-rod, confine the pivoted member N'' in proper relation to the roller. It will thus be seen that whenever the pull-rod O'' is withdrawn the roller will work upon the inclined edge of the pivoted member N'', and consequently the rod N' will be forced downwardly and the push-fingers N projected into the slots of the vertical guides or chutes, and that when the pull-rod is shoved in to its normal position the rod N' will be free to rise and withdraw the fingers N, a spring $N^3$ being provided for this purpose. The different positions occupied by the pivoted member N'' can be clearly seen in Figs. 5 and 6. The upper ends of the push-rods M carry blocks P, adjustable vertically by means of the screws $p'$, and the blocks in turn have projections $p''$ projecting into the slots in the rear walls of the guides or chutes C. The blocks are guided by and prevented from lateral movement by flanges $p^3$, projecting from the guides C to the respective sides of the slots therein. The rods M also pass through and have play in apertures formed in the plate P, and directly below this plate are adjustable sleeves P', serving to limit the upward movement of said rods, caused by the suspending-springs P''.

The operation of this portion of the apparatus may be stated thus: When a purchaser has selected the character of goods or article to be purchased, a coin of proper denomination is dropped into one or another of the coin-chutes C and is directed by the incline $c$ into the upper portion of the chute or guide C', whence it drops onto the projection $p''$ of the block $p$ and is initially supported by said projection. As is ordinarily the case, the purchaser then withdraws the pull-rod O'', and, through the medium of the pivoted member N'', the rod N', and their associated elements, the push-finger N is projected into the chute or guide C' and forced against the upper portion of the coin or coins contained therein. This pressure applied to the coin will cause the block $p$ to descend, carrying with it its supporting-bar M until said bar contacts with the flange $l''$ on the proper catch-finger L and depresses the same in position to hold the slide K directly in front of the same, so that the material in the cup may be freely discharged when the cup-carrying member is drawn forwardly.

As will be apparent, some mechanism must be provided whereby the pull-rod when a coin has been properly dropped into the apparatus may be automatically thrown in such relation to the cup-carrying slide or member as to carry the same from beneath the tubes G when the pull-rod is withdrawn. Detailed description of this feature may now be resorted to. Arms Q at the opposite ends of the plate P bear a pivot-rod $q$, to which is attached, through the arms Q', a rod $q'$, adapted to rest beneath the adjusting-screws $P^3$ of the sleeves P'. A spring $Q^3$ serves to keep this rod $q'$ in constant engagement with the screws $P^3$. Running from a central position on the rod $q'$ around the rod $q$ is a lever R, projecting to the extreme rear of the machine and attached to a spring $r$, the spring $r$ being connected at its opposite end to a pivoted lever R'. A supplemental spring $r'$ connects this last-mentioned lever with the bottom of the casing. The forward end of the lever R' is formed into a hook $r''$, which is adapted to work in an elongated loop portion $s$ of a pivoted member S. This member S is normally held in a substantially level position by means of a small spring $s'$. The tensions of the two springs $r$ and $r'$ are so equalized as to normally give a slight downward pull to the rear end of the lever R', and thereby cause its hooked portion $r''$ to rest against the upper portion of the loop S', and thereby retain the pivoted member S at substantially a level or freed position, so that should the pull-rod O'' be operated the said pivoted member will freely pass back and forth beneath the cup-carrying member J and will consequently impart no movement whatever thereto. On the other hand, should a coin be dropped into the machine and shoved down a guide or chute C' and the blocks $p$ forced downwardly in the manner hereinbefore referred to the adjusting-screws $P^3$ for the sleeves P' will impart a corresponding movement to the rod $q'$, and by reason of the elevating of its outer end the tension of the spring $r$ will be increased. The effect of this will be to elevate the rear end of the lever R' and lower its opposite or hooked end to a sufficient degree to press upon the lower portion of the loop $s$ and cause the same to move on its pivot, and thereby raise its forward or contact portion $s''$ into the position indicated by dotted lines in Fig. 4. Should the pull-rod O'' now be operated, the contact portion $s''$ will in its forward movement contact against a shoulder $s^3$ on the lower surface of the member J and said member, together with its cups, will be likewise moved forwardly into a position to deliver the article or material from the cup or cups the slides of which have been retained in their normal or rear position. Whenever the pull-rod is released, it may be automatically drawn back into closed position by a spring $O^3$, connected at one end thereto and at its opposite end to the upright $O^4$, which supports and guides the pull-rod. The cup-carrying member is automatically returned to its normal position in a similar manner by springs J'', connected thereto and to the rod L'.

In order to release the coin from the guides or chutes C', the trip-bar T is provided, the same being pivoted to the bottom of the casing, as shown in Fig. 2, and extending upwardly to overlap the lower or free ends of the push-rods M. Flexible connections $t$ are interposed between this trip-bar and the member J, so that when said member is drawn forwardly the slack in this flexible member will be taken up, the trip-rod correspondingly swung forwardly, and the lower ends of the push-rods M pressed to such extent as to cause the blocks $p$, with their projections, to be withdrawn from the chutes or guides C', the slotted plate P being available as a pivotal point in this instance. The coin will then be free to drop on through the chutes or guides into the incline chute T' and be deflected from the end T'' thereof into a suitable receptacle provided therefor.

To temporarily lock the pull-rod in withdrawn position, I have provided a locking-dog U, pivoted to a projection on the standard $O^4$, which engages the serrated upper surface $u$ of the pull-rod. When the pull-rod is withdrawn in the first instance, this dog will prevent the same from being returned by reason of the spring $O^3$; but an excessive withdrawal of said rod will cause a cam-surface $u'$ at the end of the rod to ride under the dog and throw the same out of engagement with the teeth of the rod. The dog is held in such disengaged position by reason of its upper pointed end engaging in an offset portion $u''$ of a spring $u^3$. The dog is retained in this position until the rod returns to its innermost position, when a projection $u^4$, carried thereby, will throw the dog back into engagement with the rack. The cup-carrying member J is temporarily locked in its forward position by means of a gravity-catch V, pivoted to the front wall of the casing and so disposed that it will engage an apertured portion of the slide when the same is in the position shown in dotted lines in Fig. 6. A chain or other flexible connection V' connects the tail of this gravity-catch with the pull-rod, so that when the same has been released in the manner before described and is returned to its normal position said flexible member or chain will be drawn upon and serve to trip the gravity-catch from engagement with the slide, so that the same will be free to return to its normal position by the springs J''.

Referring now more particularly to Figs. 3, 7, 8, and 9, the bag-feeding portion of the apparatus will be described.

At any desired height on the interior of the casing is a platform W, provided with suitable uprights or guides $w$ and the diagonal braces $w'$. The bags are designed to be supported upon this platform and are kept in flat position by means of a follower $w''$, provided with a stem or handle $w^3$. This platform occupies such a position relative to a delivery-opening W' in the front of the casing that the lowermost bag of a pack may be ejected through said opening within convenient reach of a purchaser. A bag-ejector arm X is pivoted at $x$ to the bottom of the casing, so as to be capable of a rocking movement beneath the bag-support. The bag-ejecting mechanism is provided with a pull-lever Y, which may normally be operated from the exterior before the application of a coin without affecting the bag-delivery arm. The normal position of the parts is best shown in Fig. 3, wherein the bag-delivery arm X is shown held in its rear position by the spring $x'$, secured to a depending guide $x''$, hanging from the platform W, and through which the pull-rod Y passes and is guided. A pin $z$ is carried by a projection $z'$ on the bag-delivery arm, and this pin is adapted to fit in notches $z''$, cut in the upper edge of a pivoted member Z, the outer end of the pivoted member being drawn upwardly by the spring Z'. The pin and notches serve temporarily to lock the bag-delivery arm in its rear or forward position, as shown, respectively, in Figs. 3 and 7. To the side of the pivoted member Z is a cam-surface 2, over which works a depending arm 3 to lower the pivoted member Z and release the notches thereof from engagement with the pin $z$, so that the arm X will be free to rock. The true normal or operative position of this arm 3 is shown in Fig. 2, while in Fig. 8 the same is thrown outward slightly to permit a clearer illustration of the adjacent parts of the apparatus. That the forward motion of the pull-rod Y may be imparted to the arm X, I provide a pivoted contact member 4, adapted by gravity to normally occupy the position shown in Fig. 7—that is, with the free end or immediate contact portion thereof running parallel with the pull-rod and out of operative position. This contact member is connected at its lower end by means of a chain 5 or the like to the cup-carrying member J. It will thus be seen that after a coin has been properly applied to a machine and the article-delivery portion thereof operated, as specifically pointed out hereinbefore, the forward movement given the cup-carrying member J will cause a pull upon the chain 5, and by reason of such pull the contact member 4 will be turned upon its pivotal point into the position shown in Fig. 3, wherein the free end thereof is elevated into operative position. Now if the pull-rod Y is drawn outwardly and operates the pivoted member Z, as stated, the immediate contact portion or free end of the member 4 will abut against the shoulder $5^a$ on the bag-delivery arm, and consequently push said arm forwardly to eject the bag. The pull-rod Y is temporarily retained in its withdrawn position by a dog 6, pivoted to a flange 7 on the support $x''$. A spring 8 has a constant tendency to turn the pawl 6 into alinement therewith, so that by engaging with the serrated upper surface of said rod it will hold the same in withdrawn position until released by a quick excessive pull thereof, when a spring 9, connected at its respective ends to a rod Y and a support $x''$, will turn the pull-rod automatically to its initial position. The bag-delivery arm is directed in its movement by the guide 10, and in order that the same may have a positive engagement with a bag the head thereof is constructed as follows: The shank is formed hollow, as shown at 11, Fig. 9, and adapted to slide therein is a stem 12, which carries the oppositely-disposed arms 13, supporting in their upper ends the serrated contact-blades 14, which are of a size to project slightly through openings 15 in the bottom of the bag-supporting platform W. The blades 14 are adjustable vertically by means of the binding-screws 16, working in suitable apertures in the arms 13 and adapted to clamp upon the blades. The blades are connected by a strip 17, which is braced by a screw 18, so that danger of the same bending when the blades are pushed forwardly is avoided. The head just described is adapted to be normally held in its lowermost position by a spring 19, operating in an obvious manner.

The lower side of the arm 13, directly above the pull-rod Y, is provided with an enlargement 20, rounded at its edges, and this enlargement is so disposed as to be operated upon by a flange 21 on the upper edge of the pull-rod Y, the flange being of such height as to force the head upward slightly against the tension of its spring 19, whereby the teeth of the blades are effectually forced into the bag.

The flange 21 has secured to its side a stop 22, which limits the upward movement of the pivoted contact member 4 and also the flat spring 23, which exerts sufficient pressure upon said member 4 when in its inoperative position to prevent the same from being jarred into position to operate the bag-delivery arm.

From the foregoing description it is thought that the several combinations and correct operations of the several parts have been clearly stated.

It will be appreciated that by this apparatus a very complete and efficient machine of its character is provided, capable of use by any one with little or no effort, all that is required on the part of the user being the successive operation of the two pull-bars. The remainder of the apparatus is complete in itself and automatic throughout.

While this particular machine has been devised for the purpose of vending candy, yet it might be employed for use with any number of analogous articles, and may even be used with granular substances, in which event the receptacles or tubes and delivery-pockets are so arranged as to have a close sliding connection therebetween.

Having thus described the invention, what is claimed as new, and desired to be secured by Letters Patent, is—

1. In a machine of the character described, the combination with a receptacle, means for delivering material from said receptacle, a bag-support, means for delivering a bag or the like from said support, means for normally retaining said delivering means in inoperative position, and means in connection with the delivering means of the receptacle for automatically releasing the bag-delivering means, substantially as described.

2. In a machine of the character described, the combination with suitable receptacles, delivery-pockets below said receptacles, false bottoms in said delivery-pockets, a pull-lever, and instrumentalities adapted to be operated by a coin in connection with said pull-lever for releasing the false bottom of one or more delivery-pockets, substantially as described.

3. In a machine of the character described, the combination with suitable delivery-pockets, of false bottoms in said pockets, a pull-lever, independent means for withdrawing the false bottoms of the respective cups, and means operated by a pull-rod in conjunction with a coin for operating one or more of the withdrawing means for the false bottoms, substantially as described.

4. In a machine of the character described, the combination with suitable receptacles, a slidable carrier for said receptacles, false bottoms on said carrier, means for independently retaining said false bottoms in normal position when the carrier is moved, a pull-rod, and intermediate mechanism adapted to be operated by said pull-rod in conjunction with a coin, for operating one or more of the retaining means for the false bottoms, substantially as described.

5. In a machine of the character described, the combination with suitable receptacles, of a slidable carrier therefor, false bottoms on said carrier beneath the receptacles, independent catches adapted to engage the respective false bottoms to retain them in normal position when the carrier is moved, means for normally holding said catches out of engagement with the false bottoms, a pull-rod, and means operated by said pull-rod in conjunction with a coin for throwing one or more of the catches into engagement with the false bottoms, substantially as described.

6. In a machine of the character described, the combination with a series of receptacles or tubes, a bracket for supporting said tubes, means on the bracket for adjusting the tubes vertically, delivery-cups below the tubes, and means for operating said cups to cause the material to be delivered therefrom, substantially as described.

7. In a machine of the character described, the combination with suitable receptacles, a carrier for said receptacles, a pull-rod, means for throwing said pull-rod into and out of engagement with the carrier, means for temporarily locking the pull-rod in withdrawn position, independent means for locking the carrier in forward position, and means on the pull-rod connected with the carrier-locking means for automatically releasing the same when the pull-rod is returned to its normal position, substantially as described.

8. In a machine of the character described, the combination with a cup or receptacle, of a sliding bottom therefor, means for withdrawing the slide comprising catch-fingers, a coin-chute, and means operating in said coin-chute in conjunction with a coin for operating the catch-fingers, substantially as described.

9. In a machine of the character described, the combination with a receptacle having a movable bottom, of a pull-rod, a coin chute or guide, a projection working in said chute or guide adapted to temporarily support a coin, means for withdrawing the bottom of the receptacle, a rod leading from the projection in the chute, to the bottom-withdrawing means, and means operated by the pull-rod, for forcing the coin upon the projection in the chute for lowering the rod to operate the bottom-withdrawing means, substantially as described.

10. In a machine of the character described, the combination with a series of pockets or receptacles having movable bottoms, of a pull-rod, catch-fingers adapted to engage said movable bottoms, means for normally retaining the catch-fingers out of engagement with the bottoms, coin chutes or guides, rods between the catch-fingers and chutes, lugs or projections on the rods working in the chutes and adapted to temporarily support a coin, means for normally retaining the projections in the chutes, means operated from the pull-rod to force the coins upon the projections to throw the catch-fingers into engagement with the bottoms of the receptacles, and a trip for releasing the projections from the chutes to permit the coins to drop, substantially as described.

11. In a machine of the character described, the combination with a suitable slidable receptacle, having a movable bottom, of a pull-rod, a catch-finger adapted to engage the movable bottom, means for normally retaining said catch-finger out of operative position, a coin chute or guide having slots in its front and rear faces, a projection adapted to work in one of said slots to temporarily support a coin, a supporting-rod for said projection, extending down to a point slightly above the catch-finger, a finger adapted to be operated in the opposite slot, a rod connected to said finger, a pivoted member having an inclined portion connected to the opposite end of the rod, and means on the pull-rod adapted to work on said inclined member to draw the finger downward upon the coin in the chute, substantially as and for the purpose described.

12. In a machine of the character described, the combination with a series of cups or receptacles having movable bottoms, a slidable carrier for the receptacles, means for retaining the bottoms in normal position when the carrier is shifted, comprising catch-fingers, intermediate mechanism adapted to be operated in conjunction with a coin for operating the catch-fingers, a pivoted trip to release the coin from said intermediate mechanism, and a flexible connection between said trip and the slidable carrier for the receptacle, substantially as described.

13. In a machine of the character described, the combination with a delivery cup or receptacle, a movable support for said receptacle, a pull-rod, a contact member carried by said pull-rod, oppositely-disposed springs of equalized tension adapted to normally retain said contact member in inoperative position on the rod, and means for increasing the tension of one of said springs to throw the contact member in a position to engage the movable carrier, substantially as described.

14. In a machine of the character described, the combination with a receptacle, of a movable carrier for said receptacle, a pull-rod, a contact member pivoted to said rod, springs for retaining said member normally in inoperative position, and means connected with said springs for tripping said contact member to throw the same in position to engage the receptacle-carrier, substantially as described.

15. In a machine of the character described, the combination with a receptacle, of a carrier for the receptacle, means for moving said carrier normally out of engagement therewith, comprising a contact member, devices for retaining the contact member out of operative position, and means for increasing the tension of one of said retaining devices to throw the contact member into operative position to engage the movable carrier, substantially as described.

16. In a machine of the character described, the combination with a receptacle, of a movable carrier therefor, a pull-rod, a contact member carried by said pull-rod adapted to engage the movable carrier when in operative position, means for normally retaining the contact member in inoperative position comprising a pivoted lever connected at one end with said member, tension devices connected to the opposite end of the lever, coin-chutes, and intermediate mechanism between the coin-chutes and tension devices adapted to be operated in conjunction with a coin for increasing the strain of one of said tension devices to trip the contact member on the pull-rod to throw the same into position to engage the carrier, substantially as described.

17. In a machine of the character described, the combination with a movable receptacle, a pull-rod for said receptacle normally out of engagement therewith, means for throwing said rod into engagement with said receptacle, a gravity-catch adapted to engage the receptacle in its forward position to temporarily hold the same, a flexible connection between said gravity-catch and the pull-rod adapted to trip the catch and release the receptacle when the pull-rod is returned to its normal position, and means for returning the receptacle to its normal position, substantially as described.

18. In a machine of the character described, the combination with a receptacle, of a pull-rod therefor, a pivoted dog adapted to engage said rod to retain the same temporarily in withdrawn position, a spring for holding said dog in operative or inoperative position, and contact devices on the rod adapted to engage the said dog to throw the same in engagement with the rod and release the same therefrom, substantially as described.

19. In a machine of the character described, the combination with a receptacle of means for operating the same, a bag-support, a delivery-arm for the bag, a pull-rod adapted to operate said delivery-arm normally held out of engagement therewith, and connecting means between said pull-rod and the operating means for the receptacle, for throwing the pull-rod into position to engage the delivery-arm, substantially as described.

20. In a machine of the character described, the combination with a bag-support, of a delivery-arm adapted to eject a bag from said support, means for operating said rod, and a head on said delivery-arm comprising blade-supporting arms, a blade on said arms, a shank adapted to loosely fit into the delivery-arm, means for retaining the head normally in its lowermost position, and means on the rod-operating means for raising the head when the rod is operated, substantially as described.

21. In a machine of the character described, the combination with a bag-support, of a delivery-arm for the bag, a slidable head on said arm adapted to contact with and eject a bag from the support, a pull-rod, a projection on the pull-rod adapted to engage the head to elevate the same when the rod is withdrawn, and a spring for normally retaining the head in its lowermost position, substantially as described.

22. In a machine of the character described, the combination with a bag-support, a bag-delivery arm, a pivoted member provided with recesses adapted to engage a portion of the bag-delivery arm to lock the same in rear or forward position, an incline on said pivoted member, a pull-rod, and means on said pull-rod adapted to work upon the incline on the pivoted member to release the same from engagement with the bag-delivery arm, substantially as described.

23. In a machine of the character described, the combination with a bag-support, of a delivery-arm therefor, a pull-rod for said delivery-arm normally out of engagement therewith, a contact member carried by said pull-rod, and means for throwing said contact member into operative position, substantially as described.

24. In a machine of the character described, the combination of a bag-support, of a delivery-arm therefor, means for normally retracting the delivery-arm, a pull-rod normally out of engagement with the delivery-arm, a contact member carried by said delivery-arm, means for limiting the movement of the contact member, and means for throwing the contact member into position to engage the bag-delivery arm when the pull-rod is operated, substantially as described.

25. In a machine of the character described, the combination with a bag-support, of a delivery-arm therefor, a pull-rod, means for locking the delivery-arm in different positions, and means operated by the pull-rod for releasing said locking means, substantially as described.

26. In a machine of the character described, the combination with a bag-support, of a bag-delivery arm, a head carried by said arm comprising oppositely-disposed arms, a toothed blade supported thereby, a bracing-screw in rear of said blade, and means for operating the bag-delivery arm, substantially as described 27. In a machine of the character described, the combination with a bag-support, of a bag-delivery arm, a head carried by said arm comprising oppositely-disposed arms, a blade supported thereby, a brace in rear of said blade, and means for operating the bag-delivery arm, substantially as described.

In testimony whereof I have affixed my signature in presence of two witnesses.

ALFRED C. EDSEN.

Witnesses:
GEORGE E. TEW,
E. M. STALEY.